Patented Oct. 21, 1941

2,260,187

UNITED STATES PATENT OFFICE 2,260,187

MOLDING POWDER

Abraham B. Miller, Newark, Del., assignor to Hercules Powder Company, Wilmington, Del., a corporation of Delaware No Drawing. Application September 30, 1938, Serial No. 232,611

8 Claims. (Cl. 260—25)

This invention relates to a molding powder and more particularly it relates to a molding powder containing as essential ingredients extracted pine wood pitch and hexamethylenetetramine.

Extracted pine wood pitch, which is complex resinous material whose exact composition is unknown, comprises the residue left after the separation of rosin, turpentine and other more valuable constituents of pine wood.

The pine wood pitch utilized in the production of condensation products used in the molding powders in accordance with this invention, as has been indicated, is obtained in connection with the production of wood rosin from pine wood. The pine wood pitch will comprise a residue low in abietic acid remaining after the separation of refined rosin high in abietic acid from the resinous material obtained by extraction of pine wood with a solvent. It is characterized by substantial insolubility in cold petroleum hydrocarbons, but will differ somewhat in its specific characteristics, such as acid number, melting point, exact petroleum ether solubility and content of naphtha and toluol soluble matter, depending upon the method for the recovery of rosin from pine wood used in its production.

As is well known, rosin may be extracted from pine wood by the use of a suitable solvent, such as hot gasoline, benzol, etc. after steaming of the wood with live steam to remove volatile oils, such as turpentine and pine oil. Again, volatile oils, as turpentine, and pine oil, may be extracted with the rosin without first steaming for their removal. Following extraction the extract will be distilled for the removal of solvent where the wood was subjected to steaming before extraction and for the removal of solvent and volatile oils, as turpentine and pine oil, where the wood was extracted directly without steaming. As the result of distillation a resinous material containing abietic acid and admixed impurities is obtained. This resinous material may be treated in any one of a number of ways, all known to the art, for the removal of refined rosin high in abietic acid. The residue remaining after the removal of refined rosin and comprising a dark colored, hard, resinous mass low in abietic acid constitutes pine wood pitch.

The exact properties of the pine wood pitch obtained as indicated above will depend upon the method used for original extraction from the wood. When the wood is steamed before solvent extraction, a pine wood pitch is obtained having somewhat different properties from that obtained when the wood is extracted without steaming. Likewise the properties of pine wood pitch are somewhat different when obtained by different methods of purification of rosin. A comparison of the properties of three pine wood pitches is given in the following table, in which pitch A is that obtained by extraction of wood with hot petroleum solvents subsequent to the removal of the volatile oils by steam distillation, refining with furfural, evaporation of the furfural and then extraction with petroleum solvent to leave pitch A as a residue. Pitch B is that obtained by a benzol extraction of unsteamed wood, evaporation of the benzol, solution of the residue in hot low boiling petroleum solvent, precipitation of the pitch B by washing with cold water, and then removal of this precipitate by filtration. Pitch C is obtained by the evaporation of the furfural layer, after refining of the gasoline solution of the crude resin obtained by the benzol extraction of pine wood.

|  | Pitch A | Pitch B | Pitch C |
|---|---|---|---|
| Melting point (Hercules drop method)_____° C__ | 91 | 115 | 102 |
| Acid number_____ | 100 | 105 | 116 |
| Unsaponifiable matter____per cent__ |  | 5 | 8 |
| V. M. & P. naphtha insoluble_do____ | 89.5 | 96 | 83 |
| Toluol soluble_____do____ |  | 40 | 98 |
| Petroleum ether insoluble____do____ | 92.0 | 99 | 95 |
| Saponification number_____ |  | 169 | 140 |
| Ash_____per cent__ |  | .036 | .022 |

The extracted pine wood pitch and hexamethylenetetramine in admixture in pulverized state comprise the novel molding powder of this invention.

During the molding operation the hexamethylenetetramine undergoes a condensation reaction with the extracted pine wood pitch, raising the melting point of the latter up to the point of infusibility. The condensation is carried out under substantially anhydrous conditions and in the absence of an aldehyde.

Under anhydrous conditions, the hexamethylenetetramine does not decompose to give formaldehyde, as occurs in the presence of water. In the absence of moisture it decomposes on heating into ammonia, amines and active methylene groups.

The condensation of hexamethylenetetramine with extracted pine wood pitch which occurs on heating these ingredients together under dry conditions, such as in hot molding, presumably involves the combination of the active methylene groups set free by the hexamethylenetetramine with the extracted pine wood pitch. The ammonia liberated acts as a catalyst for the reaction.

The amount of hexamethylenetetramine which it will be desirable to combine with the extracted pine wood pitch to produce the molding powder will be within the range of about 5 to about 25 per cent by weight based on the weight of extracted pine wood pitch and preferably within the range of about 7 to about 15 per cent by weight.

In some cases it will be desirable to employ a dry alkaline catalyst in the molding powder to accelerate the condensation, but in general the use of a catalyst will not be necessary. As alkaline catalysts, basic compounds such as, for example, sodium hydroxide, sodium carbonate, ammonium carbonate, calcium oxide, sodium acetate, etc. may be used.

To produce the molding powder of this invention the extracted pine wood pitch and hexamethylenetetramine are ground together to provide an intimate mixture. They may be ground, for example, in a ball mill at room temperature.

The extracted pine wood pitch and hexamethylenetetramine may also be blended by heating the ingredients together on heated rolls, such as a two-roll mill. A temperature of about 190° F. to about 300° F. may be used for such blending. Partial condensation takes place under such conditions, thereby shortening the heating required in the mold. The sheets obtained from the rolling operation may then be ground in a suitable mill to give the molding powder.

The extracted pine wood pitch and hexamethylenetetramine may be mixed with a phenolic molding resin to provide a combination molding powder. The phenolic resin may be incorporated in any suitable manner. Thus, the phenolic resin may be ground with the extracted pine wood pitch and hexamethylenetetramine.

The molding powder prepared in accordance with this invention may be used in conjunction with the usual inert fillers used in molding compositions. Fillers such as, for example, wood flour, cotton flock, cotton linters, asbestos, mica, etc. may be incorporated. The molding powder and filler may be mixed together in any suitable manner.

The amount of filler to be used will depend on the properties desired in the molded article. About 45 to about 55 per cent by weight of inert filler based on the weight of active ingredients of the molding powder, is generally preferable.

Thus, for example, the extracted pine wood pitch, hexamethylenetetramine and filler may be ground together at room temperature to provide the finished molding powder. If a phenolic resin is to be incorporated, it may also be ground with the other ingredients.

The extracted pine wood pitch, hexamethylenetetramine and filler, with or without inclusion of a molding phenolic resin, may likewise be blended by heating the ingredients on hot rolls, such as a two-roll mill. The sheet produced may then be ground in a suitable mill to provide the molding composition.

If the molding composition containing extracted pine wood pitch and hexamethylenetetramine is to be used for laminating purposes the extracted pine wood pitch and hexamethylenetetramine may be dissolved in a solvent such as alcohol. A laminating type of phenolic resin may be included. The laminating varnish produced in such a manner may then be used to coat or impregnate any suitable fibrous material and the laminated article molded according to the usual phenolic practice. In using a catalyst with the laminating varnish an alkaline material which will not saponify the extracted pine wood pitch in alcohol solution will desirably be used. As such, sodium acetate is a suitable catalyst.

The molding of molding powders containing extracted pine wood pitch and hexamethylenetetramine with filler and phenolic resin, if such is added, is carried out with heat and pressure in suitable molds at a temperature within the range of about 240° F. to about 325° F. and a pressure within the range of about 500 to about 3000 lbs./sq. in. The molding or curing time necessary will depend on several factors, such as, the amount of hexamethylenetetramine included, the molding temperature and the thickness of the molded article. Generally speaking, a molding time of about one to about 25 minutes is satisfactory.

The following examples are illustrative of practical procedure for the production of molding powders in accordance with this invention.

Example I

Ninety-three parts by weight of pulverized extracted pine wood pitch, 7 parts by weight of hexamethylenetetramine and 100 parts by weight of wood flour were mixed together in the dry state and then processed on a two-roll mill at a temperature of about 240° F. until homogeneous. The sheets were then ground in a Wiley mill. The pulverized composition so produced was then mixed with 200 parts by weight of a slow-curing phenolic molding resin (Bakelite BM 205) by grinding for about 24 hours in a ball mill.

The molding powder produced was molded at a temperature of about 245° F. at a pressure of about 2000 lbs./sq. in. for 10 minutes.

Example II

One hundred parts by weight of pulverized extracted pine wood pitch, 25 parts by weight of hexamethylenetetramine and 100 parts by weight of wood flour were mixed by grinding for 48 hours in a ball mill at room temperature. An equal weight of a pulverized slow-curing phenolic molding resin (Bakelite BM 205) was then added and grinding in the ball mill continued for 24 hours.

The molding powder produced was molded at a temperature of about 245° F. and a pressure of about 2000 lbs./sq. in. A molding or cure time of 11 minutes was required to secure complete condensation.

Example III

A dry, pulverized mixture of the following composition was made:

| | Parts by weight |
|---|---|
| Extracted pine wood pitch | 45 |
| Hard, rapid-curing phenolic resin (Durez No. 3638) | 200 |
| Hexamethylenetetramine | 6 |
| Sodium carbonate | 5 |
| Wood flour | 45 |

The dry composition was then moistened with 145 parts by weight of acetone and stirred to give a smooth paste. The paste was processed on a cold two-roll mill to provide adequate mixing. After drying in the air for about 24 hours the residual solvent was removed by heating to about 260° F. for about 10 minutes. The composition was then pulverized.

Molding at a temperature of about 315° F. and a pressure of about 2000 lbs./sq. in. with venting of the mold, a cure time of one minute was ample.

*Example IV*

Fifty parts by weight of pulverized extracted pine wood pitch were dissolved in 50 parts by weight of a liquid phenolic molding resin (Bakelite BR 0014). Seven parts by weight of hexamethylenetetramine and 5 parts by weight of sodium carbonate were then added. The resulting liquid resin was mixed with 112 parts by weight of wood flour by grinding in a mortar. The composition was processed on a two-roll mill at a temperature of about 240° F. until the sheet no longer adhered to the rolls. The sheet was ground to give the molding powder.

Molding at a temperature of 300° F. and a pressure of about 2000 lbs./sq. in., a cure time of 6 to 7 minutes was sufficient.

*Example V*

One hundred and sixty-five parts by weight of pulverized extracted pine wood pitch were dissolved in 144 parts by weight of ethyl alcohol. To this solution 300 parts by weight of a phenolic laminating varnish containing 55 per cent by weight of phenolic molding resin were added. Twenty-three parts of hexamethylenetetramine were then stirred into the solution.

Sheets of unsized alpha cellulose paper were impregnated with the varnish and dried at a temperature of about 260° F. Ten of the impregnated sheets were then laminated together in a hot press at a temperature of about 285° F. and a pressure of about 2000 lbs./sq. in. for 30 minutes.

While in the above examples the extracted pine wood pitch and hexamethylenetetramine were used in conjunction with phenolic molding resins, it will be understood that they may be used with other molding resins, such as, for example, shellac, or they may be used alone without any other resin.

It will be understood that the details and examples hereinbefore set forth are for the purposes of illustration only, and are not in limitation of the invention herein broadly described and claimed.

What I desire to claim and protect by Letters Patent is:

1. A molding powder comprising an admixture of hexamethylenetetramine and extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent, the said molding powder being characterized by the substantial absence of reaction product of the extracted pine wood pitch with an aldehyde and by a substantially anhydrous condition.

2. A molding powder comprising an admixture of hexamethylenetetramine, a filler and extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent, the said molding powder being characterized by the substantial absence of reaction product of the extracted pine wood pitch with an aldehyde and by a substantially anhydrous condition.

3. A molding powder comprising an admixture of hexamethylenetetramine, a filler, a phenol-aldehyde molding resin and extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent, the said molding powder being characterized by the substantial absence of reaction product of the extracted pine wood pitch with an aldehyde and by a substantially anhydrous condition.

4. A molding powder comprising an admixture of extracted pine wood pitch and 5 to 25 per cent by weight of hexamethylenetetramine based on the weight of extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent, the said molding powder being characterized by the substantial absence of reaction product of the extracted pine wood pitch with an aldehyde and by a substantially anhydrous condition.

5. A molding powder comprising an admixture of extracted pine wood pitch, a filler and 5 to 25 per cent by weight of hexamethylenetetramine based on the weight of extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent, the said molding powder being characterized by the substantial absence of reaction product of the extracted pine wood pitch with an aldehyde and by a substantially anhydrous condition.

6. A molding powder comprising an admixture of extracted pine wood pitch, a filler, a phenol-aldehyde molding resin and 5 to 25 per cent by weight of hexamethylenetetramine based on the weight of extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent, the said molding powder being characterized by the substantial absence of reaction product of the extracted pine wood pitch with an aldehyde and by a substantially anhydrous condition.

7. A laminating varnish comprising an admixture of extracted pine wood pitch, hexamethylenetetramine and a solvent therefor, the said pitch being characterized by substantial insolubility in petroleum hydrocarbons and comprising a residue low in abietic acid remaining after the separation of refined rosin high in abietic acid from the resinous material obtained by extraction of pine wood with a solvent, the said laminating varnish being characterized by the substantial absence of reaction product of the extracted pine wood pitch with an aldehyde and by a substantially anhydrous condition.

8. A laminating varnish comprising an admixture of extracted pine wood pitch, a phenol-aldehyde molding resin, hexamethylenetetramine and a solvent for the mixture, the said pitch being characterized by substantial insolubility in petroleum hydrocarbons and comprising a residue low in abietic acid remaining after the separation of refined rosin high in abietic acid from the resinous material obtained by extraction of pine wood with a solvent, the said laminating varnish being characterized by the substantial absence of reaction product of the extracted pine wood pitch with an aldehyde and by a substantially anhydrous condition.

ABRAHAM B. MILLER.